April 5, 1966  H. WHITTAKER ETAL  3,243,860
MOLDING METHODS AND ASSOCIATED APPARATUS
Filed Nov. 7, 1961  2 Sheets-Sheet 1

INVENTORS
HARRY WHITTAKER
TAYLOR MILTON GAINER
BY
Andrew K. Foulds
their ATTORNEY

United States Patent Office 3,243,860
Patented Apr. 5, 1966

3,243,860
MOLDING METHODS AND ASSOCIATED APPARATUS
Harry Whittaker and Taylor Milton Gainer, Louisville, Ky., assignors to American Radiator & Standard Sanitary Corporation, New York, N.Y., a corporation of Delaware
Filed Nov. 7, 1961, Ser. No. 150,800
1 Claim. (Cl. 25—129)

This invention relates to molding methods and to associated apparatus. The invention more particularly relates to techniques for forming articles of manufacture from ceramic body compositions or ceramic materials such as normal and flocculated slips and the like.

Examples of the products to which the methods and apparatus of the invention relate include sanitary ware, dinner ware, art ware and so forth. It is a general object of the invention to provide improvements which facilitate the manufacture of such products while at the same time reducing the cost thereof.

In the molding of ceramic materials for large scale production, molds are employed which are used repeatedly for forming a series of identical articles. It is an object of the invention to minimize the mold time required for each article so that, for a given period of time, the number of articles which can be produced is optimized.

Further, the removal of ceramic body compositions from molds normally requires special precautions in order to avoid damage due to the adhering of said compositions to the molds. An object of the invention is, in this regard, to provide for facilitating the removal of ceramic articles from their molds while avoiding damage to the articles.

A further object of the invention relates to the advantageous use of heat and pressure to improve manufacturing techniques with reference to ceramic products and the like.

Still another object of the invention is to provide improvements in molding techniques whereby mold life is increased.

Yet another object of the invention is to provide an improved mold structure which is adapted for repeated use and for molding articles free from significant strain patterns and defects.

In achieving the above and other of its objectives, the invention provides improvements having various related aspects.

According to one aspect of the invention, the viscosity of the water of suspension of the ceramic body composition or substance is reduced so that removal of the same is greatly expedited. At the same time, the technique employed to reduce viscosity as aforesaid is usefully employed to improve the mobility of the composition or substance so that this substance can be prepared externally of the associated mold and efficiently supplied to the latter.

According to a further aspect of the invention, a technique employed to urge the water of suspension from the substance is, at the same time, employed to establish conditions which permit this substance to be released readily from the associated mold.

In still further accordance with the invention, another technique contributing to the release of the substance from its mold promotes the maintaining of conditions whereby removal of the water of suspension from the substance remains unimpeded.

A feature of the invention is the provision of a porous filter having structural characteristics which significantly improve molding operations. These characteristics will be set forth in greater detail hereinafter.

Other objects, features and advantages of the invention will become apparent from the following detailed description, given by way of example and not for purposes of limitation and illustrated in the accompanying drawing in which.

Figure 1:
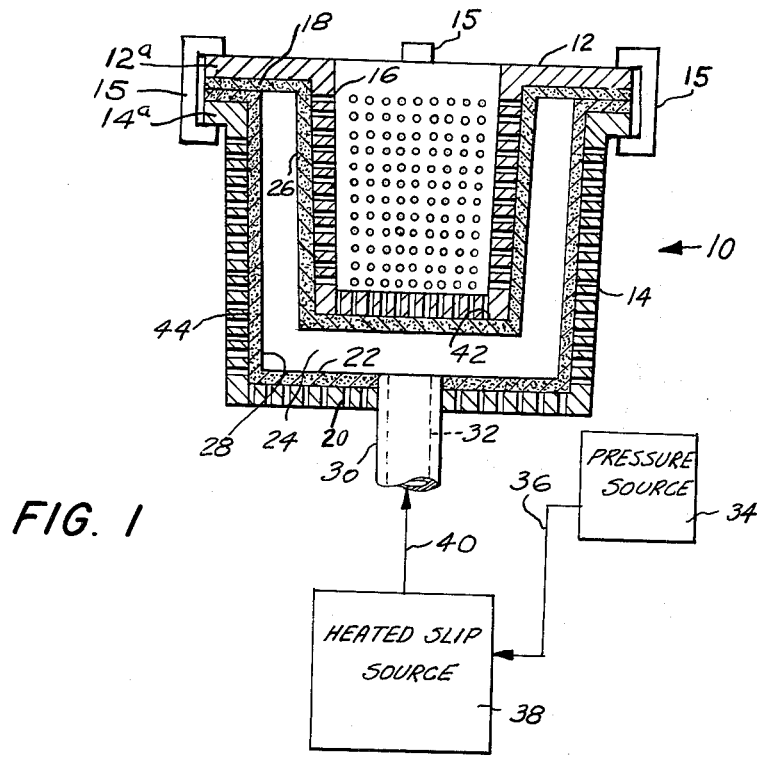
FIGURE 1 illustrates diagrammatically, and partially in section, a molding apparatus provided in accordance with the invention.

In FIG. 1 is illustrated a mold 10 inclusive of sections 12 and 14 which are adapted for mating engagement. The sections are clamped tightly together at the flanges 12a and 14a by a plurality of clamps 15 which are diagrammatically shown. Section 12 consists of a perforate back-up member 16 which, for example, may be fabricated of steel or other such material having suitable strength. Section 12 furthermore includes a porous filter member 18, the details of which will be discussed hereinafter. Section 14 includes a perforate back-up member 20 and a porous filter member 22 thereon.

Sections 12 and 14 are generally such as to define an internal chamber or mold cavity 24 having the shape of the article of manufacture to be molded. Filter members 18 and 22 particularly are provided with casting surfaces 26 and 28 defining the precise shape which is to be imparted to said article of manufacture.

Ceramic slip is supplied to the mold chamber 24 from a tank or other source 38 which is provided with means for heating the slip or other such ceramic substance. The source 38 may be provided with conventional heat exchange elements such as steam jackets, hot water tubes, electrical elements, or the like, or alternatively, may comprise a more direct type of heating arrangement such as gas burners and so forth.

The particular construction of source 38 is not significant other than for the ability of said source to heat slip and the like to a predetermined temperature or range of temperatures and to discharge the heated slip via line 40 and through the bore 32 of a tube or pipe 30 which is tightly connected to and feeds through the members 20 and 22 into the chamber 24 of mold 10.

It is to be noted that although certain provisions of the invention are applicable to the processing of a ceramic body substance which is heated in situ in the chamber 24, the preferred embodiment of the invention contemplates that the source 38 be located at a zone which is spaced from or remote from the mold 10.

The heated slip is fed from the source 38 to the mold cavity 24 by any suitable pressure means 34 which may be pneumatic, hydraulic or mechanical and which applies pressure directly onto the slip, diagrammatically illustrated by pressure line 36.

The filter members 18 and 22 of the mold have special preferred characteristics which enable these filter members to perform in accordance with certain aspects of the invention.

In this regard, the filter members 18 and 22 are porous elements fabricated of a material having a suitable cohesive strength adapted to resist deterioration under the pressures to which the filter members will be subjected, as discussed in greater detail hereinafter. Porous plastics, metals and ceramics have been found especially suitable. More particularly, preferred materials include porous sintered bronze, porous sintered steel, porous Monel, porous polyethylene, porous Teflon and porous ceramics of various types. Plaster of Paris and gypsum cement have also been employed, but these materials generally deteriorate under the conditions which are employed and are thus not to be considered preferred materials.

The filter members 18 and 22 preferably are characterized by a thickness which is less than .500″ and which, more particularly, lies within a range of thicknesses of from about .125″ to .375″. The thickness of said filter members has an effect on a pressure gradient as will be discussed hereinafter.

In order to achieve an effective drainage or evacuation of the water of suspension from the types of ceramic substances employed, it has been found especially effective to provide the filter members 18 and 22 with a collective pore volume which might in general be of the order of about 25% to 35%, although with certain materials a higher porosity might be attained consistent with sufficient strength to withstand the pressures.

Moreover, the pores in said filter members preferably have diameters lying within a range of from about 10 to 25 microns. The diameters, as will also be hereinafter indicated in greater detail, relate to the expressing of water of suspension from the substance being molded and also to the above-noted pressure gradient.

Another important characteristic of the filter members 18 and 22 is one which pertains to the casting surfaces 26 and 28. According to the invention, the casting surfaces 26 and 28 are provided with a substantially uniform permeability and the permeability variation thereof should be in an order of less than about 5%. This permeability characteristic provides for an even expressing of water of suspension throughout the entire article being molded and thus the finished article is substantially free of internal strains after being heat cured. It also results in an article which may be referred to as rigid since it is strong enough to be handled.

Three important aspects of the invention relate to the treating of a ceramic body substance with elevated pressures and temperatures and to the release of the article thus formed from its mold.

In accordance with the preferred embodiment of the invention, the heated slip source 38 provides for supplying or transferring heated slip to chamber 24 at a temperature preferably within the range of about 80° to 200° F. One purpose of providing heated slip is to reduce the viscosity of the water of suspension and thereby facilitate the expressing of the water of suspension from the substance being molded. The temperature range for a most effective expressing or filtering action is from 175° to 200° F. On the other hand, however, a temperature of from 80° to 150° F. is preferred with respect to the aforesaid pressure gradient and, for a given operation, a temperature preferably within the overall range of 80°–200° F. is to be selected.

An additional advantage achieved by providing the heated ceramic substance from a remote source is that it is possible to prepare and heat the substance which is to be molded independently of the operation of the mold 10. Thus, the mold 10 loses no operational time for purposes of heating the substance to be molded even though heating of the latter is required for purposes of expressing water of suspension therefrom in accordance with the invention.

Furthermore, it has been found of significant advantage that the heating of the ceramic body substance improves its mobility and therefore facilitates its transfer to the mold 10. Additionally, the conforming of the heated substance to the shape of the casting surfaces 26 and 28 is also facilitated.

The heated ceramic body substance charged into chamber 24 is subjected to pressure by operation of the aforenoted pressure source 34. This pressure has the effect of urging the ceramic substance against filter members 18 and 22 and expressing the water of suspension from said substance. The preferred pressure range, depending upon the substance being processed and the thickness of the same, lies within the range of from about 25 to 1000 pounds per square inch. Lower pressures may be employed should very thin articles of manufacture be desired, but the pressure range nevertheless preferably starts above ambient pressure. Moreover, although a wider range has been indicated, the pressure preferably does not exceed 750 pounds per square inch as it has been found that higher pressures do not materially reduce further the casting time. Still further, with pressures lying below about 700 pounds per square inch the casting time increases progressively as the pressure is lowered.

As has been heretofore indicated, the invention contemplates the use of a pressure gradient. This pressure gradient is caused to exist between the casting surfaces 26 and 28 of filter members 18 and 22 and the respective outer surfaces 42 and 44 of said filter members. This pressure gradient results from a retardation of the movement of the water of suspension through the filter members due to the provision of a selected range of pore diameters in the same. The desirable range of pore diameters has been noted above.

Further contributing to the pressure gradient are the filter member thickness, the pore volume and the permeability variation of said casting surfaces. The pressure and temperature involved are also significant factors and these variables can be related to assure that a significant pressure gradient is established in the filter members to achieve the release of the article of manufacture being molded in the manner next described below.

More particularly, it has been found that should the pressure being applied and maintained by the pressure source 34 be relieved or abated, the pressure gradient in the filter members employed causes the water of suspension moving therethrough to reverse its direction of movement and to return towards the article being formed. This causes the formation of a water film between said filter members and the article being formed which in turn facilitates and expedites release of the article from its mold.

The above procedure has been found admirably suitable for flat ware. Under certain circumstances involving the production of ware having various curved surfaces it has been found expedient to assist this separation technique by the application of positive pneumatic pressures applied in conventional manner.

By appropriate selection of temperature and pressure, in accordance with the above noted requirements, it has been found possible to reduce mold time significantly. For example, mold times of substantially less than five minutes are found to be possible within the scope of the invention.

Figure 2:
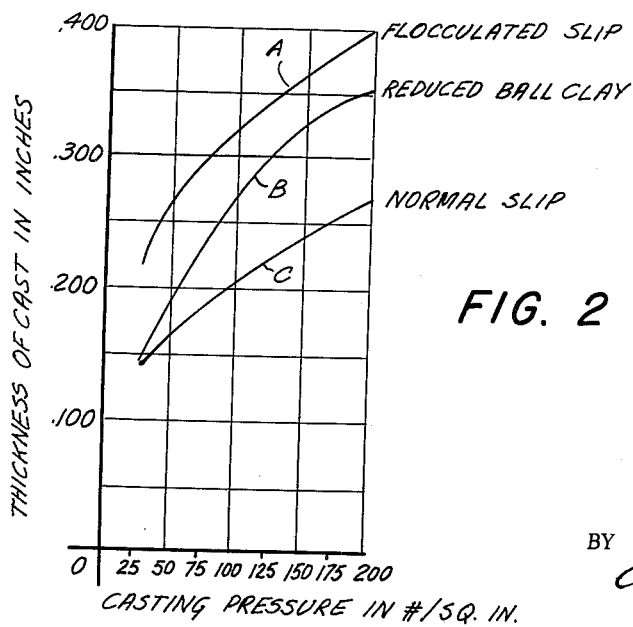
FIGURE 2 is a graph illustrating molding parameters for different substances.

FIG. 2 indicates casting pressures at room temperature, say 75° F., with respect to ceramic body substances having a specific gravity in the order of 1.80, the poor diameter range of the associated filter members being from about 10 to 20 microns. FIG. 2 illustrates curves for a casting time of five minutes, curve A being a curve for flocculated slip, curve B being for reduced ball clay and curve C being for normal slip. The units of the abscissa are pounds per square inch, whereas the units for the ordinate are inches of thickness of the casting. The curves represent the pressures yielding a good quality product for the various thicknesses.

Figure 3:
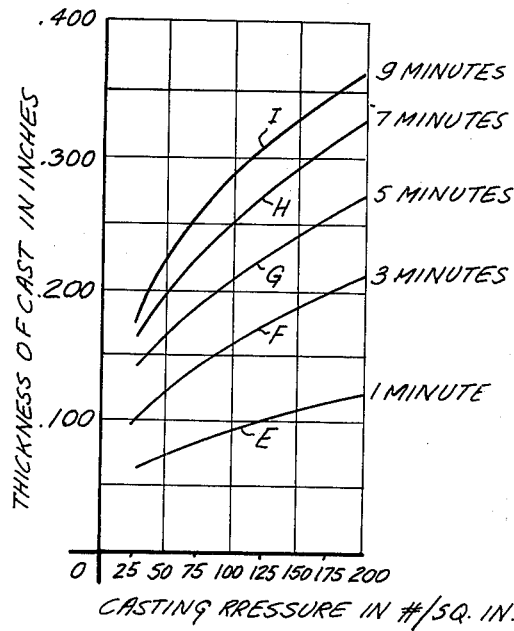
FIGURE 3 is a graph illustrating setting times relative to casting pressures and to the thickness of casting.

The curves E, F, G, H and I of FIG. 3 are respectively curves for 1, 3, 5, 7 and 9 minutes casting at room temperature for a conventional slip having a specific gravity of 1.80. It appears from these curves that, for a given thickness of molded product, smaller casting pressures are required for longer casting periods. More significant, however, is the fact that casting periods can obviously be reduced in accordance with the invention to less than one minute for certain ranges of casting thickness.

A conventional or normal slip would have composition corresponding generally to the following formula:

| | Percent |
|---|---|
| Ball clay | 25 |
| China clay or kaolin | 22.5 |
| Flint | 18.5 |
| Feldspar | 16.0 |
| Nepheline syenite | 18.0 |

Figure 4:
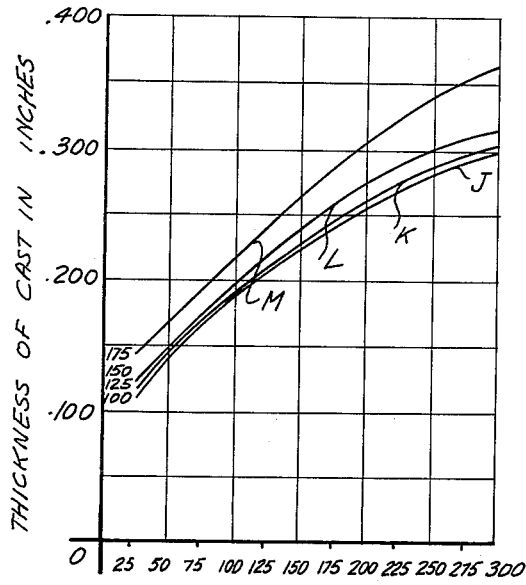
FIGURE 4 is a graph illustrating casting pressures relative to thickness of casting for variations in temperature of a normal slip.

Curves J, K, L and M of FIG. 4 are respectively curves corresponding to slip temperatures of 100°, 125°, 150° and 175° F., a three minute casting time being employed in connection with normal slip having a specific gravity of about 1.80.

From the above it will be evident that the mold structure characteristics proposed are combined judiciously with temperature and pressure ranges to achieve a number of objectives. Principally mold time is reduced to a minimum, while at the same time the release of the resulting product from the associated mold is facilitated by a unique pressure gradient technique. Furthermore, in accordance with the invention, heated slip or other such ceramic body material is supplied from a remote zone to avoid the need for employing mold time for heating the processed substance to facilitate the expressing of water of suspension therefrom. Still further, the invention utilizes the enhanced mobility of the heated ceramic body substance to facilitate the transfer thereof to associated mold.

The ease with which molded objects are separated from their respective molds in accordance with the teachings of the invention result in molded articles which are free of defects. Moreover, an extended mold life is assured.

The pore diameter range indicated above not only contributes to the retarding of the movement of the water of suspension through the associated filter members, but also assures that the molded substance cannot be forced into the filter members to block and clog the same.

It should also be noted that pressure casting with porous molds, other than plaster, results in elimination of the scum which forms on the mold body due to the solubility of the plaster.

Articles taken from molds provided in accordance with the invention may be conventionally heat treated or fired and due to the uniform and substantial removal of water of suspension therefrom will result in china, ceramic or earthenwear which is free of internal strain and which, therefore, can be expected to perform the desired functions efficiently and effectively.

There will now be obvious to those skilled in the art many modifications and variations of the methods and apparatus set forth above. These modifications and variations will not, however, depart from the scope of the invention if defined by the following claim.

What is claimed is:

Apparatus comprising a mold including at least two mating mold sections each including a perforate steel back-up member and a filter member on said back-up member and defining a shape for an article of manufacture to be molded in said mold, said filter member having a thickness of about .125 to .375 inch, an effective pore volume of about 25–35%, a casting surface defining said shape and having a permeability variation of less than about 5%, and pores of about 10 to 25 microns; and means for applying pressure to a preheated ceramic-like substance fed to said mold.

References Cited by the Examiner

UNITED STATES PATENTS

| | | | |
|---|---|---|---|
| 1,536,358 | 5/1925 | Stacy | 25—129 |
| 1,680,832 | 8/1928 | Wilder. | |
| 1,701,238 | 2/1929 | Kennedy | 162—411 |
| 2,000,623 | 5/1935 | Taylor | 25—129 |
| 2,017,691 | 10/1935 | Drum et al. | |
| 2,042,635 | 6/1936 | Schellens | 55—523 |
| 2,220,641 | 11/1940 | Davis | 55—523 |
| 2,261,583 | 11/1941 | Hemphill | 264—86 |
| 2,359,201 | 9/1944 | Chaplin et al. | |
| 2,400,099 | 5/1946 | Brubaker et al. | 55—523 |
| 2,521,128 | 9/1950 | Ramsay. | |
| 2,522,298 | 9/1950 | Ramsay. | |
| 2,720,278 | 10/1955 | Wiley | 55—523 |
| 2,782,868 | 2/1957 | Hopkins | 55—523 |
| 2,818,628 | 1/1958 | Steele et al. | 25—129 |
| 2,835,019 | 5/1958 | Thiess | 264—86 |
| 2,842,267 | 7/1958 | Shire et al. | |
| 2,964,822 | 12/1960 | Tomkins. | |
| 2,979,400 | 4/1961 | Mouwen | 210—510 X |
| 2,981,979 | 5/1961 | Seelfuth et al. | 264—126 |
| 2,982,418 | 5/1961 | Bailey | 210—510 X |
| 2,985,918 | 5/1961 | Moore et al. | 264—127 |
| 3,102,300 | 9/1963 | Rottig | 264—126 |

J. SPENCER OVERHOLSER, *Primary Examiner.*

ROBERT F. WHITE, MICHAEL V. BRINDISI,
*Examiners.*

G. A. KAP, *Assistant Examiner.*